United States Patent [19]

Nakamura et al.

[11] Patent Number: 4,981,899

[45] Date of Patent: Jan. 1, 1991

[54] RUBBER COMPOSITION

[75] Inventors: Tsutomu Nakamura; Takeshi Fukuda, both of Gunma, Japan

[73] Assignee: Shin-Etsu Chemical Co., Ltd., Tokyo, Japan

[21] Appl. No.: 357,232

[22] Filed: May 25, 1989

[30] Foreign Application Priority Data

May 26, 1988 [JP] Japan .................. 63-129261

[51] Int. Cl.$^5$ ............................. C08K 3/34
[52] U.S. Cl. ..................... 524/493; 524/217; 524/228
[58] Field of Search ............. 524/217, 493, 228

[56] References Cited

U.S. PATENT DOCUMENTS 3,393,175  7/1968  Baitinger ............. 524/217
4,150,010  4/1979  Itoh ................... 524/506

Primary Examiner—Joseph L. Schofer
Assistant Examiner—Peter D. Mulcahy
Attorney, Agent, or Firm—Millen, White & Zelano

[57] ABSTRACT

Rubber compositions which, in addition to conventional ingredients of an ethylene-propylene copolymeric rubber, an organopolysiloxane having ethylenically unsaturated linkages, a vulcanizing agent and finely divided reinforcing silica filler, contain an N,N'-alkylenediamine bis-stearoamide eliminate the problem of surface staining of the metal molds repeatedly used to mold the rubber composition caused by the aging retarder therein and thus enough aging retarder can be included therein so that rubber vulcinizates having excellent heat resistance can be prepared from the rubber compositions without creating a surface stain problem.

15 Claims, No Drawings

RUBBER COMPOSITION

BACKGROUND OF THE INVENTION

The present invention relates to a rubber composition, more particularly, to a rubber composition capable of giving rubber vulcanizates having excellent heat resistance and comprising a binary copolymeric rubber of ethylene and propylene or ternary copolymeric rubber of ethylene, propylene and a diene compound as the principal ingredient and which are free from the problem of stain on the surface of the metal mold even after repeated molding of the rubber composition therein.

Usually shaped rubber articles are manufactured by molding a rubber composition in a metal mold at a high temperature under high compressive pressure to effect vulcanization of the rubber composition. A problem in this rubber molding process is that the surface of the metal mold sometimes becomes stained by repeating the molding procedure to such an extent that the rubber article molded and vulcanized in such a stained metal mold no longer has a surface gloss which greatly decreases the yield of acceptable products. Therefore, metal molds must be cleaned periodically in order to ensure acceptable quality of the rubber products molded therein. Cleaning metal molds are very time- and labor-consuming and greatly increases the manufacturing costs of the rubber articles. Accordingly, it is important that the rubber composition is so formulated that the metal mold used for molding the composition is less liable to surface stain even after repeating the molding procedure many times.

The staining of metal molds mentioned above has been a serious problem in the rubber industry for a long time but the mechanism leading to the phenomenon is not yet fully clear. Along with the recent progress in the technology of analysis, however, it is now possible to directly examine the surface of metal molds so that certain information has already been obtained on the constituents of the stain deposited on the surface of metal molds used for rubber molding. It is reported, for example, that the stain is mainly composed of a degradation product of the rubbery polymer and the aging retarder usually formulated in most rubber compositions. Such information, however, has not yet been utilized to establish a measure for solving the problem of stain on the metal molds.

SUMMARY OF THE INVENTION

It is an object of the present invention to provide a novel rubber composition which is free from the problem of surface staining of metal molds in which the rubber composition is molded and vulcanized even when the rubber composition is compounded with a usual amount of an aging retarder and which gives a rubber vulcanizate having excellent heat resistance.

The rubber composition of the invention comprises, in admixture:

(a) 100 parts by weight of a binary copolymer of ethylene and propylene or a ternary copolymer of ethylene, propylene and a diene compound;

(b) from 10 to 100 parts by weight of an organopolysiloxane having, at least two ethylenically unsaturated linkages;

(c) from 10 to 150 parts by weight of a finely divided silica powder having a specific surface area of at least 50 m$^2$/g;

(d) from 0.03 to 5 parts by weight of an N,N'-alkylenediamine bisamide compound having 13 to 50 carbon atoms in a molecule; and (e) a vulcanizing agent in an amount sufficient to vulcanize the composition into a rubbery vulcanizate.

DETAILED DESCRIPTION OF THE PREFERRED EMBODIMENTS

The inventive rubber composition comprises, as the essential ingredients, the components (a), (b), (c), (d) and (e), of which the components (a), (b), (c) and (e) are rather conventional and the component (d) is the most characteristic. By virtue of its unique formulation, the rubber composition causes little staining of metal molds, which makes possible manufacturing a large number of shaped rubber articles having good surface gloss without periodical cleaning of the metal mold. In addition, the inventive rubber composition can be formulated with a full amount of an aging retarder without creating the problem of metal mold staining for which the aging retarder is responsible so that the rubber vulcanizate may have good heat resistance.

The component (a) of the inventive rubber composition is a polyolenfin-based organic rubbery polymer which is a binary copolymer of ethylene and propylene, referred to as an EPM hereinbelow, or a ternary copolymer of ethylene, propylene and a diene compound, referred to as an EPDM hereinbelow, or a blend thereof. It is preferable that the ethulene moiety content in the EPM or EPDM is in the range from 40 to 70% by weight. Suitable diene compounds as the comonomer in the EPDM include ethylidene norbornene, dicyclopentadiene, 1,4-hexadiene and the like.

The component (b) of the inventive rubber composition is an organopolysiloxane which is covulcanizable with component (a). In this regard, it is essential that the organopolysiloxane has at least two ethylenically unsaturated linkages, such as vinyl groups, allyl groups and the like, in its and molecule. The organopolysiloxane is represented by the unit formula

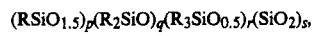

$(RSiO_{1.5})_p(R_2SiO)_q(R_3SiO_{0.5})_r(SiO_2)_s$, in which R is an unsubstituted or substituted monovalent hydrocarbon group exemplified by alkyl groups, e.g., methyl, ethyl, propyl and butyl groups, cycloalkyl groups, e.g., cyclohexyl group, alkenyl groups, e.g., vinyl and allyl groups, and aryl groups, e.g., phenyl and tolyl groups, as well as those substituted groups obtained by replacing a part or all of the hydrogen atoms in the above named hydrocarbon groups with halogen atoms, cyano groups, mercapto groups and the like, e.g., chloromethyl, 3,3,3-trifluoropropyl, 2-cyanoethyl and mercaptomethyl groups, an alkoxy group exemplified by methoxy group, ethoxy group, propoxy group, butoxy group, and the like, or a hydroxy group and the subscripts p, q, r and s are each zero or a positive integer independently from the others, with the proviso that not all of them are simultaneously equal to zero. It is also optional that two kinds or more of different types of organopolysiloxanes are used in combination as the component (b).

The organopolysiloxane can be prepared by a conventional method well known in the art of silicone products. For example, an organopolysiloxane composed of recurring diorganosiloxane units ($R_2SiO$) can be prepared by the ring-opening polymerization reaction of a cyclic oligomer, e.g., cyclic trimer to pentamer, of the diorganosiloxane units, such as octamethyl cyclotetrasiloxane and the like, in the presence of an acidic or alkaline catalyst. Further, a resinous organopolysiloxane represented by the unit formula $(R_3SiO_{0.5})_r(SiO_2)_s$, in which r and s are each a positive integer, with the proviso that the ratio is in the range from 0.4 to 2.1, can be prepared by the cohydrolysis of a hydrolyzable silane mixture composed of sodium silicate and a monofunctional hydrolyzable organosilane compound such as trimethyl chlorosilane and the like optionally, according to need, together with a trifunctional hydrolyzable organosilane compound such as methyl trichlorosilane, phenyl trichlorosilane, methyl trimethoxy silane, phenyl trimethoxy silane, vinyl trichlorosilane and the like and a difunctional hydrolyzable silanes such as dimethyl dichlorosilane, methyl vinyl dichlorosilane, dimethyl dimethoxy silane and the like followed, if necessary, by the polymerization reaction after removal of hydrochloric acid as a by-product from a chlorine-containing silane.

The combined use of the organopolysiloxane as the component (b) with the polyolefin-based organic polymer as the component (a) has the effect of improving the weatherability and heat resistance of the vulcanizate obtained by curing the rubber composition and also decreasing the consistency of the rubber composition compounded with a silica-based filler mentioned below to serve as a kind of processing aid which facilitates roll milling and molding of the rubber composition even without admixture of a so-called process oil (see, for example, U.S. Pat. Nos. 4,151,156, 4,150,010, 4,201,698, 4,376,185 and 4,533,687 and Japanese Patent Publications Nos. 55-39248 and 57-17011).

The organopolysiloxane as the component (b) is compounded with the polyolefin-based organic polymer as the component (a) in an amount in the range from 10 to 100 parts by weight, preferably, from 20 to 70 parts by weight per 100 parts by weight of the component (a). When the amount of the organopolysiloxane is too small, the desired advantageous effects by the addition thereof cannot be fully obtained as a matter of course. When the amount of the organopolysiloxane is too large, on the other hand, the rubber vulcanizate obtained by curing the rubber composition may be poor in the mechanical strengths.

The component (c) comprised in the inventive rubber composition is a finely divided silica powder which serves as a reinforcing filler. It is essential that the silica filler as the component (c) has a specific surface area of at least 50 $m^2/g$ in order that the desired reinforcing effect can be fully exhibited. Various types of finely divided silica powders can be used for the purpose including so-called fumed silica fillers and precipitated silica fillers. The amount of the finely divided silica powder as the component (c) compounded in the inventive rubber composition is in the range from 10 to 150 parts by weight per 100 parts by weight of the polyolefin-based organic polymer as the component (a). When the amount of the silica powder is too small, the desired reinforcing effect cannot be fully obtained as a matter of course. When the amount thereof is too large, on the other hand, great difficulty is encountered in roll milling and molding of the composition in addition to a decrease in the mechanical properties of the rubber vulcanizate obtained from the rubber composition. It is optional in order to facilitate roll milling of the composition compounded with a relatively large amount of the silica powder that a wetting agent, such as various kinds of silane compounds and low-molecular organopolysiloxanes, is compounded together with the finely divided silica powder.

The component (d) comprised in the inventive rubber composition, which is the most characteristic ingredient, is an N,N'-alkylenediamine bisamide compound and is effective to prevent stain of the surface of metal mold repeatedly used for molding of the inventive rubber composition. It is essential in order to fully obtain the desired effect that the bisamide compound has at least 13, preferably 13 to 50 carbon atoms, in a molecule. Examples of suitable N,N'-alkylenediamine bisamide compounds include N,N'-methylenediamine bismide compounds such as N,N'-methylenediamine bisstearoamide, N,N'-methylenediamine bisbehenamide, N,N'-methylenediamine bismyristoamide, N,N'-methylenediamine biscapronamide and the like, N,N'-ethylenediamine bisamide compounds such as N,N'-ethylenediamine bisstearoamide, N,N'-ethylenediamine biscapronamide and the like, N,N'-hexamethylenediamine bisamide compounds such as N,N'-hexamethylenediamine bisstearoamide, N,N'-hexmethylenediamine biscapronamide, N,N'-hexamethylenediamine bishydroxystearoamide and the like, and so on. These bisamide compounds can be used either singly or as a combination of two kinds or more according to need. Among the above named bisamide compounds, particularly preferable are N,N'-hexamethylenediamine bisstearoamide, N,N'-methylenediamine bisstearoamide, N,N'-methylenediamine bismyristoamide and N,N'-hexmethylenediamine biscapronamide.

The amount of the bisamide compound as the component (d) in the inventive rubber composition is in the range from 0.03 to 5 parts by weight, preferably from 0.1 to 5 parts by weight per 100 parts by weight of the polyolefin-based organic polymer as the component (a). When the amount of the bisamide compound is too small, the desired effect of stain prevention cannot be obtained while no further increased improvement can be obtained by increasing the amount thereof in excess of the above mentioned upper limit.

The rubber composition of the present invention can be prepared by uniformly blending the above described components (a) to (d) each in a specified amount. The blending machine used here is not particularly limitative including conventional rubber processing machines such as Banbury mixers, pressurizable kneaders, two-roller mills and the like. It is essential that the rubber composition should be admixed with a vulcanizing agent as the component (e) in addition to the components (a) to (d). Examples of suitable vulcanizing agents include organic peroxides, e.g., dicumyl peroxide, di-tert-butyl peroxide, tert-butyl cumyl peroxide, 2,5-dicumyl 2,5-di(tert-butylperoxy) hexane, 2,5-dimethyl-2,5-di(tert-butylperoxy) hexyne, 1,1-bis(tert-butylperoxy)-3,3,5-trimethyl cyclohexane and the like, and sulfur. When sulfur is used as the vulcanizing agent, it is preferable that sulfur is added in combination with a vulcanization accelerator such as 2-mercapto benzothiazol, tetramethyl thiuram monosulfide and the like. It is important that, when compounding the components (a) to (d) is performed at an elevated temperature, the vulcanizing agent and optional vulcanization accelerator are added to the composition only after the composition has been cooled to a temperature below the decomposition temperature of these additive compounds. The amount of the vulcanizing agent in the inventive composition is in the range from 0.05 to 3.0 parts by weight or, preferably, from 0.1 to 2.0 parts by weight per 100 parts by weight of the component (a) though not particularly limitative thereto provided that the amount is sufficient for the full vulcanization of the composition.

Optionally the inventive rubber composition is compounded with various kinds of additives conventionally used in rubber compositions such as heat-resistance improvers, ultraviolet absorbers, carbon-functional silanes and the like.

The rubber composition of the invention is described in more detail by way of examples, which follow in which the term of "parts" always refers to "parts by weight". The effect of surface stain prevention on the metal mold was evaluated by visually examining the surface of the metal mold after 10 shots of repeated injection molding of the rubber composition into 150 mm by 150 mm square rubber sheets having a thickness of 1 mm of an injection molding machine under the specified molding conditions.

EXAMPLE 1

A base compound was prepared by uniformly blending, in a pressurizable kneader, 70 parts of a polyolefin-based EPDM rubber (Esprene 567, a product by Sumitomo Chemical Co.), 30 parts of a gum-like methyl vinyl polysiloxane having an average degree of polymerization of about 8000 and composed of 99.5% by moles of dimethyl siloxane units $(CH_3)_2SiO$ and 0.5% by moles of methyl vinyl siloxane units $(CH_3)(CH_2=CH)SiO$, 30 parts of a finely divided precipitated silica filler having a specific surface area of 230 $m^2/g$ (Nipsil LP, a product by Nippon Silica Co.), 5 parts of zinc oxide and 1 part of stearic acid.

Four curable rubber compositions, referred to as the compositions I, II, III and IV hereinbelow, were prepared each by uniformly admixing, on a two-roller mill, the above prepared base compound with 2 parts of 2-mercaptobenzimidazole as an aging retarder (Nocrack MB, a product by Ouchi Shinko Chemical Co.), 1 part of N,N'-hexamethylenediamine bisstearoamide, N,N'-methylenediamine bisstearoamide, N,N'-methylenediamine bismyristoamide or N,N'-hexamethylenediamine biscapronamide, respectively, and then 2.8 parts of dicumyl peroxide. The thus prepared composition I was shaped and vulcanized into a rubber sheet of 2 mm thickness by compression molding at 170° C. for 10 minutes under a pressure of 100 kgf/cm². Separately, ten rubber sheets of 1 mm thickness were prepared in the above described manner for the purpose of mold stain examination. The rubber sheets were subjected to measurements of their mechanical properties, either as vulcanized or after thermal aging at 180° C. for 168 hours, to give the results shown in Table 1 below which also shows the condition of the surface of the metal mold after 10 shots of molding. The same table also shows the results obtained with the compositions II, III and IV in the same manner as with the composition I.

For comparison, two more rubber compositions, referred to as compositions V and VI hereinbelow, were prepared in the same manner as in the preparation of the composition I excepting omission of the bisamide compound in the composition V and omission of both of the bisstearoamide compound and the aging retarder in the composition VI. The same tests as for the composition I were undertaken for these comparative compositions to give the results shown in Table 1. The surface stain on the metal mold used for molding of the composition V was examined by the infrared absorption spectrophotometric method to determine that the infrared absorption spectrum of the stain material was approximately identical with that of the aging retarder.

EXAMPLE 2

A curable rubber composition, referred to as the composition VII hereinbelow, was prepared in about the same manner as in the preceding example from 100 parts of a polyolefin-based EPDM rubber (EPT 3045, a product by Mitsui Petrochemical Co.), 50 parts of the same silica filler as used in Example 1, 10 parts of the same gum-like organopolysiloxane as used in Example 1, 5 parts of a silicone fluid expressed by the formula $HO-[-Si(CH_3)_2-O-]_{10}-H$, 5 parts of zinc oxide, 1 part of stearic acid, 1 part of a polymerized 2,2,4-trimethyl-1,2-dihydroquinoline as an aging retarder (Antigen RD, a product by Sumitomo Chemical Co.), 0.5 part of another aging retarder (Nocrack MB, supra), 2 parts of N,N'-hexamethylenediamine bisstearoamide and 2.8 parts of tert-butyl cumyl peroxide.

For comparison, two more rubber compositions, referred to as the compositions VIII and IX hereinbelow, were prepared within the same formulation as above excepting omission of the bisstearoamide compound in the composition VIII and omission of both of the two aging retarders and the bisstearoamide compound in the composition IX.

Each of these three rubber compositions was subjected to the same tests as in Example 1 to give the results shown in Table 1.

EXAMPLE 3

Three curable rubber compositions were prepared in about the same manner as in Example 2 from 60 parts of the same EPDM rubber as used in Example 2, 40 parts of a gum-like methyl phenyl vinyl polysiloxane having an average degree of polymerization of about 8000 and composed of 81.5% by moles of dimethyl siloxane units $(CH_3)_2SiO$, 18.0% by moles of diphenyl siloxane units $(C_6H_5)_2SiO$ and 0.5% by moles of methyl vinyl siloxane units $(CH_3)(CH_2=CH)SiO$, 30 parts of a fumed silica filler having a different specific surface area of 130, 200 or 380 $m^2/g$ (Aerosils 130, 200 and 380, respectively, each a product by Nippon Aerosil Co.), 2 parts of an aging retarder (Nocrack MB, supra), 0.5 part of N,N'-hexamethylenediamine bisstearoamide and 2.8 parts of dicumyl peroxide.

These rubber compositions were each subjected to the same tests as in Example 1 except that the molding pressure was 80 kgf/cm² instead of 100 kgf/cm² to find no surface stain on the metal mold even after 10 shots or more of repeated molding procedures. The thus prepared rubber vulcanizates had a tensile strength of 120, 140 and 160 kgf/cm², respectively, to show the significance of the specific surface area of the silica filler.

For comparison, another rubber composition was prepared with the same formulation as above excepting replacement of the fumed silica filler with the same amount of a fine silica powder having a specific surface area of 19 $m^2/g$ (Crystalite VXS, a product by Tatsumori Co.) to find that the tensile strength of the vulcanizate prepared from the composition was only 30 kgf/cm² and impractically low.

TABLE 1

| | | Composition No. | | | | | | | | |
|---|---|---|---|---|---|---|---|---|---|---|
| | | I | II | III | IV | V | VI | VII | VIII | IX |
| As vulcanized | Hardness, JIS A | 63 | 62 | 63 | 60 | 61 | 61 | 60 | 59 | 62 |
| | Ultimate elongation, % | 400 | 380 | 410 | 450 | 420 | 350 | 370 | 380 | 350 |
| | Tensile strength, kgf/cm$^2$ | 65 | 66 | 63 | 70 | 64 | 50 | 61 | 60 | 53 |
| Increment after thermal aging | Hardness, point | +14 | +12 | +13 | +12 | +13 | +14 | −1 | −2 | ±0 |
| | Ultimate elongation, % | −40 | −35 | −36 | −39 | −43 | −75 | −65 | −60 | −75 |
| | Tensile strength, % | −5 | −3 | −4 | −5 | −3 | −25 | −60 | −60 | −80 |
| Surface stain of metal mold | | no | no | no | no | yes | a little | no | yes | a little |

What is claimed is:

1. A rubber composition which comprises, in admixture:
    (a) 100 parts by weight of a polyolefin-based organic rubber which is a binary copolymer of ethylene and propylene or a ternary copolymer of ethylene, propylene and a diene compound;
    (b) from 10 to 100 parts by weight of an organopolysiloxane having, at least two ethylenically unsaturated linkages;
    (c) from 10 to 150 parts by weight of a finely divided silica powder having a specific surface area of at least 50 m$^2$/g;
    (d) from 0.03 to 5 parts by weight of an N,N'-alkylenediamine bisamide compound having 13 to 50 carbon atoms in the molecule; and
    (e) a vulcanizing agent in an amount sufficient to vulcanize the composition into a rubbery vulcanizate.

2. The rubber composition as claimed in claim 1 wherein the polyolefin-based organic rubber as the component (a) contains from 40 to 70% by weight of the ethylene moiety.

3. The rubber composition as claimed in claim 1 wherein the amount of the component (b) is in the range from 5 to 70 parts by weight per 100 parts by weight of the component (a).

4. The rubber composition as claimed in claim 1 wherein the N,N'-alkylenediamine bisamide compound is selected from the group consisting of N,N'-hexamethylenediamine bisstearoamide, N,N'-methylenediamine bisstearoamide, N,N'-methylenediamine bismyristoamide and N,N'-hexamethylenediamine biscapronamide.

5. The rubber composition as claimed in claim 1 wherein the amount of the component (e) is in the range from 0.1 to 2 parts by weight per 100 parts by weight of the component (a).

6. The rubber composition as claimed in claim 1 wherein the vulcanizing agent is an organic peroxide.

7. The rubber composition as claimed in claim 6 wherein the amount of the vulcanizing agent is in the range from 0.05 to 3.0 parts by weight per 100 parts by weight of the component (a).

8. The rubber composition as claimed in claim 1 wherein the polyolefin-based organic rubber as the component (a) contains from 40 to 70% of the ethylene moiety, wherein the amount of the component (b) is in the range from 5 to 70 parts by weight per 100 parts by weight of the component (a), wherein the amount of the component (d) is in the range from 0.1 to 5 parts by weight per 100 parts by weight of the component (a) and wherein the amount of the vulcanizing agent is in the range from 0.05 to 3.0 parts by weight per 100 parts by weight of the component (a).

9. The rubber composition as claimed in claim 8 wherein the vulcanizing agent is an organic peroxide.

10. A rubbery vulcanizate produced by vulcanizing a rubber composition as claimed in claim 1.

11. A rubbery vulcanizate produced by vulcanizing a rubber composition as claimed in claim 8.

12. The rubber composition as claimed in claim 1, wherein the polyolefin-based organic rubber as the component (a) contains from 40 to 70% by weight of the ethylene moiety; wherein the amount of the component (b) is in the range from 5 to 70 parts by weight per 100 parts by weight of the component (a); and wherein the amount of the bisamide compound is in the range from 0.1 to 5 parts by weight per 100 parts by weight of the component (a).

13. The rubber composition as claimed in claim 12, wherein the vulcanizing agent is an organic peroxide and wherein the amount of the vulcanizing agent is in the range from 0.05 to 3.0 parts by weight per 100 parts by weight of the component (a).

14. A method of inhibiting the staining of the metal mold surfaces by the repeated high temperature molding into a rubbery vulcanizate of rubber compositions comprising a binary copolymerizate of ethylene and propylene or a ternary copolymer of ethylene, propylene and a diene and a metal mold surface stain promoting aging retarder, which comprises employing as the vulcanizable rubber composition a composition according to claim 1.

15. A method of inhibiting the staining of the metal mold surfaces by the repeated high temperature molding into a rubbery vulcanizate of rubber compositions comprising a binary copolymerizate of ethylene and propylene or a ternary copolymer of ethylene, propylene and a diene and a metal mold surface stain promoting aging retarder, which comprises employing as the vulcanizable rubber composition a rubber composition according to claim 12.

* * * * *